US008999256B2

(12) United States Patent
Zimmerman et al.

(10) Patent No.: US 8,999,256 B2
(45) Date of Patent: Apr. 7, 2015

(54) PROCESS AND APPARATUS FOR PRODUCING DIESEL FROM A HYDROCARBON STREAM

(71) Applicant: UOP LLC, Des Plaines, IL (US)

(72) Inventors: Paul R. Zimmerman, Palatine, IL (US); Peter Kokayeff, Naperville, IL (US); Michael R. Smith, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 170 days.

(21) Appl. No.: 13/922,502

(22) Filed: Jun. 20, 2013

(65) Prior Publication Data
US 2014/0377140 A1 Dec. 25, 2014

(51) Int. Cl.
C10G 69/00 (2006.01)
C10G 47/00 (2006.01)
C10G 49/00 (2006.01)
B01D 3/00 (2006.01)

(52) U.S. Cl.
CPC .................................... B01D 3/009 (2013.01)

(58) Field of Classification Search
CPC .......... B01D 3/00; B01D 3/009; C10G 45/00; C10G 47/00; C10G 49/00; C10G 69/00; C10G 2400/04
See application file for complete search history.

(56) References Cited

U.S. PATENT DOCUMENTS

| 4,755,280 | A | 7/1988 | Hudson et al. |
| 5,000,839 | A | 3/1991 | Kirker et al. |
| 5,203,987 | A | 4/1993 | de la Fuente |
| 5,403,469 | A | 4/1995 | Vauk et al. |
| 5,558,766 | A | 9/1996 | Prada et al. |
| 6,294,080 | B1 | 9/2001 | Thakkar et al. |
| 6,296,758 | B1 | 10/2001 | Kalnes et al. |
| 6,379,533 | B1 | 4/2002 | Thakkar et al. |
| 6,596,155 | B1 | 7/2003 | Gates et al. |
| 6,623,623 | B2 | 9/2003 | Kalnes |
| 6,797,154 | B2 | 9/2004 | Mukherjee et al. |
| 6,841,062 | B2 | 1/2005 | Reynolds |
| 6,843,906 | B1 | 1/2005 | Eng |
| 7,108,779 | B1 | 9/2006 | Thakkar |
| 7,531,082 | B2 * | 5/2009 | Mukherjee et al. ............. 208/57 |

(Continued)

FOREIGN PATENT DOCUMENTS

JP  4434750 B2    3/2010
WO  2004005436 A1 1/2004

OTHER PUBLICATIONS

Search Report dated Aug. 21, 2014 for corresponding PCT Appl. No. PCT/US2014/032910.

(Continued)

Primary Examiner — Natasha Young

(57) ABSTRACT

A process and apparatus are disclosed for hydrotreating a hydrocarbon feed in a hydrotreating unit and hydrocracking a liquid hydrotreating effluent stream in a hydrocracking unit. A hot separator separates the diesel in a liquid hot hydrotreating effluent stream that serves as feed to the hydrocracking unit. Low sulfur diesel product can be saturated to further upgrade its cetane rating.

20 Claims, 3 Drawing Sheets

(56) References Cited

U.S. PATENT DOCUMENTS

| | | |
|---|---|---|
| 7,686,941 B2 | 3/2010 | Brierley et al. |
| 7,763,218 B2 | 7/2010 | Hunter et al. |
| 7,951,290 B2 | 5/2011 | Thakkar et al. |
| 8,002,967 B2 | 8/2011 | Hunter et al. |
| 2006/0196809 A1 | 9/2006 | Mukherjee et al. |
| 2008/0230441 A1 | 9/2008 | Hunter et al. |
| 2010/0061927 A1 | 3/2010 | Knudsen et al. |
| 2012/0016167 A1* | 1/2012 | Hanks .............................. 585/14 |
| 2012/0292229 A1 | 11/2012 | Wieber et al. |
| 2013/0098803 A1 | 4/2013 | Zimmerman et al. |
| 2013/0158314 A1* | 6/2013 | Schleicher et al. ........... 585/253 |

OTHER PUBLICATIONS

Maddox, "Integrated solutions for Optimized ULSD Economics", NPRA Annual Meeting Papers, v 2003, 21p, 2003-Annual Meeting—National Petrochemical and Refiners Association, Mar. 23, 2003.

Maddox, "Integrated solutions for optimised ULSD economics", Petroleum Technology Quarterly, v 8, n 5, p. 95-101, Autumn 2003; ISSN: 1362363X; Publisher: Crambeth Allen Publishing.

Stanislaus, "Recent advances in the science and technology of ultra low sulfur diesel (ULSD) production", Catalysis Today 153 (2010) 1-68.

U.S. Appl. No. 13/922,478, filed Jun. 20, 2013.

* cited by examiner

PROCESS AND APPARATUS FOR PRODUCING DIESEL FROM A HYDROCARBON STREAM

FIELD OF THE INVENTION

The field of the invention is the production of diesel by hydrotreating and hydrocracking

BACKGROUND OF THE INVENTION

Hydrocracking refers to a process in which hydrocarbons crack in the presence of hydrogen and catalyst to lower molecular weight hydrocarbons. Depending on the desired output, the hydrocracking unit may contain one or more beds of the same or different catalyst. Hydrocracking is a process used to crack hydrocarbon feeds such as vacuum gas oil (VGO) to diesel including kerosene and gasoline motor fuels.

Mild Hydrocracking (MHC) typically processes VGO to produce FCC feed and distillate as the major products. Mild hydrocracking is generally used upstream of a fluid catalytic cracking (FCC) or other process unit to improve the quality of an unconverted oil that can be fed to the downstream unit, while converting part of the feed to lighter products such as diesel. As world demand for diesel motor fuel is growing relative to gasoline motor fuel, mild hydrocracking is being considered for biasing the product slate in favor of diesel at the expense of gasoline. Mild hydrocracking may be operated with less severity than partial or full conversion hydrocracking to balance production of diesel with the FCC unit, which primarily is used to make naphtha. Partial or full conversion hydrocracking is used to produce diesel with less yield of the unconverted oil which can be fed to a downstream unit.

Since MHC reactors are typically operated at low to moderate conversion and lower pressures than full conversion hydrocrackers, the distillate produced from MHC units can be high in sulfur such as 20-150 wppm because the environment in the MHC reactor has a high concentration of hydrogen sulfide. In addition, the high concentration of ammonia in the MHC reactor reduces hydrocracking activity requiring higher operating temperatures further limiting sulfur conversion. As a result, diesel from the MHC reactor may need to be treated in a distillate hydrotreater to achieve ultra low sulfur diesel (ULSD). The extra processing adds to the capital and operating costs.

Due to environmental concerns and newly enacted rules and regulations, saleable diesel must meet lower and lower limits on contaminates, such as sulfur and nitrogen. New regulations require essentially complete removal of sulfur from diesel. For example, the ULSD requirement is typically less than 10 wppm sulfur. The value of diesel motor fuel is indicated by its cetane rating.

Hydrotreating refers to a process in which olefins and aromatics are saturated and heteroatoms, such as sulfur, nitrogen and metals are removed from the hydrocarbon feedstock over catalyst in the presence of hydrogen. Hydrotreating is an essential step in the production of ULSD.

There is a continuing need, therefore, for improved methods of producing more diesel from hydrocarbon feedstocks than gasoline. Such methods must ensure that the diesel product meets increasingly stringent product requirements and provides sufficiently high cetane rating.

BRIEF SUMMARY OF THE INVENTION

In a process embodiment, the invention comprises a process for producing diesel from a hydrocarbon stream comprising hydrotreating a hydrocarbon feed stream over hydrotreating catalyst in the presence of hydrogen. A hydrotreating effluent stream is separated into a vaporous hot hydrotreating effluent stream and a liquid hot hydrotreating effluent stream. The vaporous hot hydrotreating effluent stream is separated into a vaporous cold hydrotreating effluent stream and a liquid cold hydrotreating effluent stream. The liquid cold hydrotreating effluent stream is fractionated. Lastly, the liquid hot hydrotreating effluent stream is hydrocracked.

In an additional process embodiment, the invention further comprises producing a diesel stream in the fractionation of the liquid cold hydrotreating effluent stream and saturating the diesel stream.

In another additional process embodiment, the invention further comprises hydrocracking the liquid hot hydrotreating effluent stream at a pressure within about 500 kPa (73 psi) of a pressure at which the hydrocarbon stream is hydrotreated.

In an apparatus embodiment, the invention comprises apparatus for producing diesel from a hydrocarbon stream comprising a hydrotreating reactor. A hot separator is for separating a hydrotreating effluent stream into a vaporous hot hydrotreating effluent stream in a hot separator overhead line and a liquid hot hydrotreating effluent stream in a hot separator bottoms line. A cold separator is in direct communication with the hot separator overhead line for separating the vaporous hot hydrotreating effluent stream into a vaporous cold hydrotreating effluent stream and a liquid cold hydrotreating effluent stream in a cold separator bottoms line. A fractionation column is in communication with the cold separator bottoms line. Lastly, a hydrocracking reactor in communication with the hot separator bottoms line for hydrocracking the liquid hot hydrotreating effluent stream.

In an additional apparatus embodiment, the invention further comprises a saturation reactor in communication with the fractionation column.

In another apparatus embodiment, the invention further comprises a diesel line in communication with a side outlet of the fractionation column.

The present invention greatly improves the ability to achieve ultra-low sulfur diesel (ULSD) by separating the hydrotreating catalyst and the hydrocracking catalyst into separate stages. The first hydrotreating unit is followed by a hot separator. The hydrogen sulfide and ammonia are removed, along with naphtha and light ends, from the liquid hot hydrotreating effluent stream comprising diesel prior to being fed to the hydrocracking unit. This allows the hydrocracking reactor to operate in a cleaner environment more favorable for sulfur conversion enabling achievement of ULSD. A saturation reactor can be utilized to further upgrade the cetane rating of the diesel product.

DEFINITIONS

Figure 1:
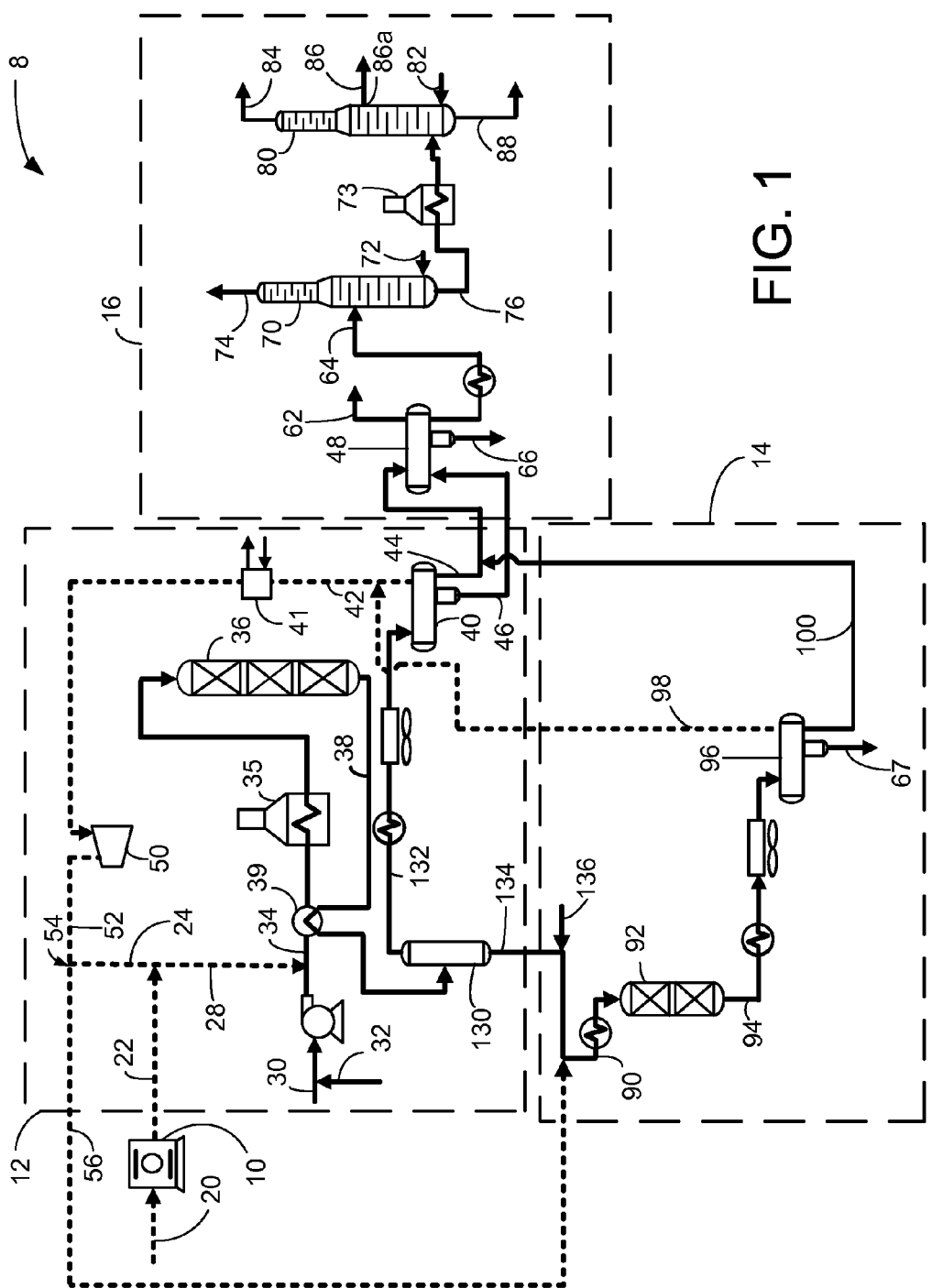
FIG. 1 is a simplified process flow diagram of an embodiment of the present invention.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. However, columns that strip with steam do not typically include a reboiler, but they may. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of the reflux or reboil to the column.

As used herein, boiling points refer to the True Boiling Point. The term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "conversion" means conversion of feed to material that boils at or below the diesel boiling range. The cut point of the diesel boiling range is between 343° and 399° C. (650° to 750° F.) using the True Boiling Point distillation method.

As used herein, the term "diesel boiling range" means hydrocarbons boiling in the range of between 132° and 399° C. (270° to 750° F.) using the True Boiling Point distillation method.

DETAILED DESCRIPTION

The present invention separates the hydrotreating reactor and the hydrocracking reactor into separate stages. The hydrotreating reactor is followed by a hot separator which separates hydrogen sulfide and ammonia along with naphtha and light ends from diesel and heavier hydrocarbons prior to being fed to the hydrocracking reactor. This allows the hydrocracking reactor to operate in a cleaner environment more favorable for cracking to distillate range material and for sulfur conversion enabling production of ULSD. The ULSD may be subjected to saturation in an aspect to saturate aromatic rings to increase the cetane rating of the diesel product.

In the embodiment of FIG. 1, the apparatus and process 8 for producing diesel comprise a compressor 10, a hydrotreating unit 12, a hydrocracking unit 14 and a fractionation section 16. A first hydrocarbon feed is fed to the hydrotreating unit 12 to reduce the nitrogen to levels favorable for hydrocracking, such as 0-100 wppm nitrogen. A significant amount of sulfur is converted to hydrogen sulfide and part of the VGO in the first hydrocarbon feed is converted into diesel and lighter products. A diesel and heavier stream is separated from a hydrotreating effluent in a hot separator and forwarded to the hydrocracking unit 14 to provide ULSD.

A make-up hydrogen stream in a make-up hydrogen line 20 is fed to at least one compressor 10 which may comprise a train of one or more compressors 10 in communication with the make-up hydrogen line for compressing the make-up hydrogen stream and provide a compressed make-up hydrogen stream in compressed make-up hydrogen line 22. The compressed make-up hydrogen stream in compressed make-up hydrogen line 22 may join with a first compressed recycle hydrogen stream comprising hydrogen in a first split line 24 as hereinafter described to provide a hydrotreating hydrogen stream in a hydrotreating hydrogen line 28.

The hydrotreating hydrogen stream in the hydrotreating hydrogen line 28 may join a hydrocarbon feed stream in line 30 to provide a hydrotreating feed stream in a hydrocarbon feed line 34. The hydrocarbon feed stream may be supplemented with a co-feed from co-feed line 32 to be joined by the hydrotreating hydrogen stream from hydrotreating hydrogen line 28.

The hydrocarbon feed stream is introduced in line 30 perhaps through a surge tank. In one aspect, the process and apparatus described herein are particularly useful for hydroprocessing a hydrocarbonaceous feedstock. Illustrative hydrocarbonaceous feedstocks include hydrocarbonaceous streams having components boiling above about 288° C. (550° F.), such as atmospheric gas oils, VGO, deasphalted, vacuum, and atmospheric residua, coker distillates, straight run distillates, solvent-deasphalted oils, pyrolysis-derived oils, high boiling synthetic oils, cycle oils, hydrocracked feeds, cat cracker distillates and the like. A suitable hydrocarbonaceous feedstock is a VGO or other hydrocarbon fraction having at least 50 percent by weight, and usually at least 75 percent by weight, of its components boiling at a temperature above about 399° C. (750° F.). A typical VGO normally has a boiling point range between about 315° C. (600° F.) and about 565° C. (1050° F.). A suitable co-feed stream in co-feed line 32 may include diesel streams such as coker distillates, straight run distillates, cycle oils and cat cracker distillates which may boil in the range of about 149° C. (300° F.) to about 371° C. (700° F.). These hydrocarbonaceous feed stocks may contain from 0.1 to 4 wt-% sulfur.

A hydrotreating reactor 36 is in downstream communication with the at least one compressor 10 on the make-up hydrogen line 20 and the hydrocarbon feed line 34. The hydrocarbon feed stream in the hydrocarbon feed line 34 may be heat exchanged with a hydrotreating effluent stream in line 38 and further heated in a fired heater 35 before entering the hydrotreating reactor 36. The hydrotreating reactor 36 may be in downstream communication with the hydrocarbon feed line 30 and the hydrocarbon co-feed line 32.

Hydrotreating is a process wherein hydrogen gas is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. Cloud point of the hydrotreated product may also be reduced.

The hydrotreating reactor 36 may comprise more than one vessel and multiple beds of hydrotreating catalyst. The hydrotreating reactor 36 in FIG. 1 has three beds in one reactor vessel, but more or less beds and vessels may be suitable. Two to four beds of catalyst in the hydrotreating reactor 36 are preferred. In the hydrotreating reactor, hydrocarbons with heteroatoms are further demetallized, desulfurized and denitrogenated. The hydrotreating reactor may also contain hydrotreating catalyst that is suited for saturating aromatics, hydrodewaxing and hydroisomerization. Hydrotreating catalyst suited for one or more of the aforementioned desired reactions may be loaded into each of the beds in the hydrotreating reactor. It is contemplated that one of the beds in the hydrotreating reactor 36 may be a hydrocracking catalyst to open naphthenic rings produced from aromatics saturated in an upstream hydrotreating catalyst bed; the balance of the catalyst beds comprising hydrotreating catalyst. Hydrogen from the hydrotreating hydrogen line 28 may also be fed to the hydrotreating reactor 36 between catalyst beds (not shown).

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same hydrotreating reactor 36. The Group VIII metal is typically present in an amount ranging from 2 to 20 wt-%, preferably from 4 to 12 wt-%. The Group VI metal will typically be present in an amount ranging from 1 to 25 wt-%, preferably from 2 to 25 wt-%.

Preferred hydrotreating reaction conditions include a temperature from 290° C. (550° F.) to 455° C. (850° F.), suitably 316° C. (600° F.) to 427° C. (800° F.) and preferably 343° C. (650° F.) to 399° C. (750° F.), a pressure from 4.1 MPa (600 psig), preferably 6.2 MPa (900 psig) to 13.1 MPa (1900 psig), a liquid hourly space velocity of the fresh hydrocarbonaceous feedstock from 0.5 $hr^{-1}$ to 4 $hr^{-1}$, preferably from 1.5 to 3.5 $hr^{-1}$, and a hydrogen rate of 168 to 1,011 $Nm^3/m^3$ oil (1,000-6,000 scf/bbl), preferably 168 to 674 $Nm^3/m^3$ oil (1,000-4,000 scf/bbl) for diesel feed, with a hydrotreating catalyst or a combination of hydrotreating catalysts. The hydrotreating unit 12 may be integrated with the hydrocracking unit 14, so they both operate at the same pressure accounting for normal pressure drop.

In the hydrotreating reactor 36, the hydrocarbon feed stream is hydrotreated over hydrotreating catalyst in the presence of hydrogen. In an aspect, the hydrocarbon feed stream and a hydrocarbon co-feed stream may by hydrotreated together in the hydrotreating reactor 36.

The hydrocarbon stream that is passed through the hydrotreating reactor 36 is reduced in nitrogen to levels favorable for hydrocracking and also undergoes significant conversion of organic sulfur. Additionally, the hydrotreating reactor converts part of the hydrocarbon feed stream into diesel and lighter products. A hydrotreating effluent exits the hydrotreating reactor 36 in hydrotreating effluent line 38. The hydrotreating effluent line 38 is in downstream communication with the hydrotreating reactor 36. At least a portion of the hydrotreating effluent stream 38 may be fractionated downstream of the hydrotreating reactor 36 to produce a diesel stream in a diesel line 86.

The hydrotreating effluent stream in line 38 may be cooled in a cooler 39 on the hydrotreating effluent line 38 and fed to a hot separator 130. The cooler 39 may be a heat exchanger that gives off heat to the hydrotreating feed in line 34. The hot separator 130 is in downstream communication with the hydrotreating reactor 36 and the hydrotreating effluent line 38. The hot separator 130 separates the cooled hydrotreating effluent in hydrotreating effluent line 38 to provide a vaporous hot hydrotreating effluent stream in an overhead line 132 and a liquid hot hydrotreating effluent stream in a bottoms line 134. The hot separator 130 may operate at a temperature of about 177° C. (350° F.) to about 343° C. (650° F.) and preferably operates at about 232° C. (450° F.) to about 288° C. (550° F.). The hot separator may be operated at the same pressure as the hydrotreating reactor 36, the only reduction resulting from pressure drop in the line 38. The hot separator may be operated to keep diesel and heavier hydrocarbons in the liquid hot hydrotreating effluent stream in the bottoms line 134 and naphtha and lighter materials in the vaporous hot hydrotreating effluent stream in the overhead line 132. In an aspect, a greater proportion of diesel from the hydrotreating effluent stream in hydrotreating effluent line 38 is obtained in the liquid hot hydrotreating effluent stream in bottoms line 134 than in the vaporous hot hydrotreating effluent stream in overhead line 132. In an aspect, at least about 80 wt-%, suitably about 90 wt-%, of the diesel in the hydrotreating effluent stream in hydrotreating effluent line 38 exits the hot separator 130 in the liquid hot hydrotreating effluent stream in the hot separator bottoms line 134. The vaporous hot hydrotreating effluent stream in line 132 may be cooled before entering the cold separator 40.

The vaporous hot hydrotreating effluent stream in the hot separator bottoms line 134 from the hot separator comprising diesel and heavier hydrocarbons may be mixed with an optional co-feed such as a diesel stream in line 136. The liquid hot hydrotreating effluent stream in bottoms line 134 may be joined by a second hydrocracking hydrogen stream in a second hydrogen split line 56 to provide a hydrocracking feed stream in hydrocracking feed line 90. The hydrocracking feed stream may be heated in line 90. A fired heater may not be necessary to preheat the hydrocracking feed stream to hydrocracking temperature because the liquid hot hydrotreating effluent stream is already hot after retaining much of the heat from the hydrotreating reactor 36. A hydrocracking reactor 92 is in downstream communication with the hot separator bottoms line 134 of the hot separator 130.

In the hydrocracking reactor 92, the diesel and heavier stream is hydrocracked in the presence of the hydrocracking hydrogen stream and hydrocracking catalyst to provide a hydrocracking effluent stream in hydrocracking effluent line 94. In an aspect, all of the hydrocracking hydrogen stream is taken from the compressed hydrogen stream in line 52 via the second hydrogen split line 56.

Hydrocracking refers to a process in which hydrocarbons crack in the presence of hydrogen to lower molecular weight hydrocarbons. In the hydrocracking reactor 92, a desired conversion of heavier hydrocarbons to diesel range hydrocarbons is obtained along with conversion of the remaining organic sulfur in the diesel and heavier stream facilitated by the clean environment in the reactor.

The hydrocracking reactor 92 may comprise one or more vessels, multiple beds of catalyst in each vessel, and various combinations of hydrotreating catalyst and hydrocracking catalyst in one or more vessels. In some aspects, the hydrocracking reaction provides total conversion of at least 20 vol-% and typically greater than 60 vol-% of the hydrocarbon feed to products boiling below the diesel cut point. The hydrocracking reactor 92 may operate at partial conversion of more than 50 vol-% or full conversion of at least 90 vol-% of the feed based on total conversion. To maximize diesel, full conversion is effective. The first vessel or bed may include hydrotreating catalyst for the purpose of further saturating, demetallizing, desulfurizing or denitrogenating the hydrocracking feed. Hydrogen from the second hydrogen split line 56 may also be fed to the hydrocracking reactor 92 between catalyst beds (not shown).

The hydrocracking reactor 92 may be operated at mild hydrocracking conditions. Mild hydrocracking conditions will provide about 20 to about 60 vol-%, preferably about 20 to about 50 vol-%, total conversion of the hydrocarbon feed to product boiling below the diesel cut point. In mild hydrocracking, converted products are biased in favor of diesel. In a mild hydrocracking operation, the hydrotreating catalyst has just as much or a greater conversion role than hydrocracking catalyst. Conversion across the hydrotreating catalyst may be a significant portion of the overall conversion. If the hydrocracking reactor 92 is intended for mild hydrocracking, it is contemplated that the mild hydrocracking reactor 92 may be loaded with all hydrocracking catalyst, or some beds of hydrotreating catalyst and some beds of hydrocracking catalyst. In the last case, the beds of hydrocracking catalyst may typically follow beds of hydrotreating catalyst.

The hydrocracking reactor 92 in FIG. 1 has two catalyst beds in one reactor vessel. If mild hydrocracking is desired, it is contemplated that the first catalyst bed comprise hydrotreating catalyst or hydrocracking catalyst and the last catalyst bed comprise hydrocracking catalyst. If partial or full hydrocracking is preferred, more beds of hydrocracking catalyst may be used than used in mild hydrocracking. The hydrocracking reactor 92 may also be better suited than the hydrotreating reactor 36 to contain hydrotreating catalyst that is suited for saturating aromatics, hydrodewaxing and hydroisomerization because the hydrocracking feed in line 90 comprises less sulfur and nitrogen which can poison such hydrotreating catalysts.

At mild hydrocracking conditions, the feed is selectively converted to heavy products such as diesel and kerosene with a low yield of lighter hydrocarbons such as naphtha and gas. Pressure is also moderate to limit the hydrogenation of the bottoms product to an optimal level for downstream processing.

In one aspect, for example, when a balance of middle distillate and naphtha is preferred in the hydrocracking effluent, mild hydrocracking may be performed in the hydrocracking reactor 92 with hydrocracking catalysts that utilize amorphous silica-alumina bases or low-level zeolite bases combined with one or more Group VIII or Group VIB metal hydrogenating components. In another aspect, when middle distillate is significantly preferred in the hydrocracking effluent over naphtha production, partial or full hydrocracking may be performed in the hydrocracking reactor 92 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between 4 and 14 Angstroms ($10^{-10}$ meters). It is preferred to employ zeolites having a relatively high silica/alumina mole ratio between 3 and 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between 8-12 Angstroms ($10^{-10}$ meters), wherein the silica/alumina mole ratio is 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least 10 percent, and preferably at least 20 percent, metal-cation-deficient, based on the initial ion-exchange capacity. In another aspect, a desirable and stable class of zeolites is one wherein at least 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between 0.05 percent and 30 percent by weight may be used. In the case of the noble metals, it is normally preferred to use 0.05 to 2 wt-%.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., 371° to 648° C. (700° to 1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between 5 and 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably about 343° C. (650° F.) to about 435° C. (815° F.), a pressure of the same as in the hydrotreating reactor 36, less the pressure drop sustained in transport between reactors, such as from 3.9 MPa (571 psig), preferably 6.0 MPa (871 psig) to 12.9 MPa (1871 psig), a liquid hourly space velocity (LHSV) from about 1.0 to less than about 2.5 $hr^{-1}$ and a hydrogen rate of about 421 $Nm^3/m^3$ oil (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure as in the hydrotreating reactor 36 previously stated, a liquid hourly space velocity (LHSV) from about 0.5 $hr^{-1}$ to about 2 $hr^{-1}$ and preferably about 0.7 $hr^{-1}$ to about 1.5 $hr^{-1}$ and a hydrogen rate of about 421 $Nm^3/m^3$ oil (2,500 scf/bbl) to about 1,685 $Nm^3/m^3$ oil (10,000 scf/bbl). In an aspect, the pressure in the hydrocracking reactor 92 for hydrocracking the liquid hot hydrotreating effluent stream should be within about 500 kPa (73 psi), suitably 400 kPa (62 psi), and preferably 200 kPa (31 psi), of the pressure in the hydrotreating reactor 36 for hydrotreating the hydrocarbon feed stream.

The hydrocracking effluent stream exits the hydrocracking reactor 92 in a hydrocracking effluent line 94 which is in downstream communication with the hydrocracking reactor 92. The hydrocracking effluent stream in hydrocracking effluent line 94 may be cooled and separated in a hydrocracking separator 96 in downstream communication with the hydrocracking effluent line 94 from the hydrocracking reactor 92. The hydrocracking separator 96 separates the hydrocracking effluent into a vaporous hydrocracking effluent stream comprising hydrogen in a hydrocracking separator overhead line 98 and a liquid hydrocracking effluent stream in a hydrocracking separator bottoms line 100. The vaporous hydrocracking effluent stream comprising hydrogen in the hydrocracking separator overhead line 98 may be mixed with a vaporous cold hydrotreating effluent stream in a cold separator overhead line 42 to be described. In an aspect, the liquid hydrocracking effluent stream in the hydrocracking separator bottoms line 100 may join the liquid cold hydrotreating effluent stream in the cold separator bottoms line 44 to be fractionated with the liquid cold hydrotreating effluent stream. It is also contemplated to subject the liquid hydrocracking effluent stream to fractionation separate from the hydrotreating effluent in a fractionation section other than fractionation section 16, where product quality may benefit.

The hydrocracking separator 96 may be operated between about 46° C. (115° F.) to 63° C. (145° F.) and about the same pressure as the hydrocracking reactor 92 accounting for pressure drop in the line to keep hydrogen and light gases such as hydrogen sulfide and ammonia in the overhead line 98 and hydrocarbons in the bottoms line 100. The hydrocracking separator 96 also has a boot for collecting an aqueous phase in line 67.

In a further aspect, the vaporous hot hydrotreating effluent in overhead line 132 from the hot separator 130 may be delivered to the cold separator 40. In an aspect, the entire vaporous hot hydrotreating effluent stream in the hot separator overhead line 132 is fed to the cold separator 140.

The cold separator 40 is in downstream communication with the hydrotreating reactor 36 and is in direct, downstream communication with the hot separator overhead line 132 of the hot separator 130. The vaporous hot hydrotreating effluent stream may be separated in the cold separator 40 to provide a vaporous cold hydrotreating effluent stream comprising hydrogen in overhead line 42 and a liquid cold hydrotreating effluent stream in a bottoms line 44. The cold separator 40, therefore, is in downstream communication with the overhead line 132 of the hot separator 130. The vaporous hydrocracking effluent stream comprising hydrogen in the hydrocracking separator overhead line 98 from the hydrocracking separator 96 may be mixed with the vaporous cold hydrotreating effluent stream in the cold separator overhead line 42 from the cold separator 40 to be processed together.

The cold separator 40 may be operated between about 46° C. (115° F.) and 63° C. (145° F.) and about the same pressure as the hydrotreating reactor 36 accounting for pressure drop in the lines therebetween to keep hydrogen and light gases such as hydrogen sulfide and ammonia in the overhead line 42 and normally liquid hydrocarbons in the bottoms line 44. The cold separator 40 also has a boot for collecting an aqueous phase in line 46.

The liquid cold hydrotreating effluent stream in bottoms line 44 comprising cold liquid hydrotreated effluent may be fractionated in a fractionation column 80 in the fractionation section 16. The fractionation column 80 may be in downstream communication with the cold separator bottoms line 44 and/or the hydrocracking separator bottoms line 100. In an aspect, liquid hydrocracking effluent in the hydrocracking separator bottoms line 100 may be mixed with the liquid cold hydrotreating effluent stream in bottoms line 44, and they are fractionated together. Fractionating the liquid cold hydrotreating effluent stream and the liquid hydrocracking effluent stream may include flashing the liquid cold hydrotreating effluent stream 44 and the liquid hydrocracking effluent stream in a cold flash drum 48 which may be operated at the same temperature as the cold separator 40 but at a lower pressure of between 1.4 MPa and 3.1 MPa (gauge) (200-450 psig). The flash separation may provide a liquid flash stream in a bottoms line 64 from the liquid cold hydrotreating effluent stream and the liquid hydrocracking effluent stream and a vaporous light ends stream in an overhead line 62. The aqueous stream in line 46 from the boot of the cold separator 40 may also be directed to the cold flash drum 48. A flash aqueous stream may be removed from a boot in the cold flash drum 48 in line 66. The flash liquid stream in bottoms line 64 comprising liquid hydrotreated effluent may be fractionated in a fractionation column 80.

Fractionating the liquid cold hydrotreating effluent stream and the liquid hydrocracking effluent stream may also include stripping the cold flash liquid stream in a stripping column 70 before it is fractionated in the fractionation column 80 to remove more of the light gases from the liquid hydrotreating effluent and the liquid hydrocracking effluent stream. In an aspect, the cold flash liquid stream in bottoms line 64 may be heated and fed to the stripping column 70. The cold flash liquid stream may be stripped with an inert gas such as steam from line 72 to provide a light ends stream of hydrogen, hydrogen sulfide, ammonia, steam and other gases in an overhead line 74. A portion of the light ends stream may be condensed and refluxed to the stripping column 70. The stripping column 70 may be operated with a bottoms temperature between about 232° C. (450° F.) and about 288° C. (550° F.) and an overhead pressure of about 690 kPa (100 psig) to about 1034 kPa (gauge) (150 psig). A stripped bottoms stream comprising stripped liquid hydrotreating effluent and stripped liquid hydrocracking effluent in a stripping bottoms line 76 may be removed from a bottom of the hydrotreating stripping column 70, heated in a fired heater 73 and fed to the fractionation column 80.

The fractionation column 80 may fractionate the liquid hydrotreated effluent stream and the liquid hydrocracking effluent stream perhaps by stripping with an inert gas such as steam from line 82 to provide an overhead naphtha stream in line 84. The overhead naphtha stream in line 84 may require further processing before its blending in the gasoline pool. It may first require catalytic reforming to improve the octane number. The reforming catalyst may not require the overhead naphtha to be further desulfurized in a naphtha hydrotreater prior to reforming. The fractionation column 80 fractionates the liquid hydrotreating and hydrocracking effluent streams to produce a side stream comprising a low sulfur diesel stream having an initial boiling point of about 121° C. (250° F.), preferably about 177° C. (350° F.) to about 288° C. (550° F.) in line 86 and substantially reduced in sulfur and nitrogen content. The diesel stream comprises less than 50 wppm sulfur qualifying it as LSD and preferably less than 10 wppm sulfur qualifying it as ULSD. The diesel stream in the diesel line 86 may be removed from a diesel side outlet 86a in the fractionation column 80 for recovery or further processing. The diesel line 86 is in downstream communication with the side outlet 86a of the fractionation column. It is also contemplated that a further side cut be taken to provide a separate light diesel or kerosene stream taken above the diesel side outlet 86a. A portion of the overhead naphtha stream in line 84 may be condensed and refluxed to the fractionation column 80.

The fractionation column 80 may be operated with a bottoms temperature between about 288° C. (550° F.) and about 385° C. (725° F.), preferably between about 315° C. (600° F.) and about 357° C. (675° F.) and at or near atmospheric pressure. A portion of the bottoms may be reboiled and returned to the fractionation column 80 instead of using inert gas stripping. A bottoms stream substantially reduced in nitrogen and sulfur may be taken from a bottom of the fractionation column 80 in line 88 comprising VGO which will make an excellent fluid catalytic cracking (FCC) feedstock. The bottoms stream in line 88 may be in upstream communication with an FCC unit (not shown).

The cold separator overhead line 42 may be in downstream communication with the hydrocracking separator overhead line 98. The vaporous cold hydrotreating effluent stream in overhead line 42, which may be mixed with the vaporous hydrocracking effluent stream in the overhead line 98, may be scrubbed with an absorbent solution which may comprise an amine in a scrubber 41 to remove ammonia and hydrogen sulfide as is conventional. Scrubbing may be performed prior to recycle of the vaporous hydrotreating effluent stream and perhaps the vaporous hydrocracking effluent stream mixed therewith comprising hydrogen to the recycle gas compressor 50.

The mixed vaporous hydrotreating effluent stream and vaporous hydrocracking effluent stream in line 42 may be compressed in a recycle gas compressor 50 to provide a recycle hydrogen stream in line 52 which may be a compressed vaporous hydrotreating and hydrocracking effluent stream. The recycle gas compressor 50 may be in downstream communication with the hydrocracking reactor 92 and the hydrotreating reactor 36. A split 54 on the recycle hydrogen line 52 provides the first recycle hydrogen split stream in the first split line 24 in upstream communication with the hydrotreating reactor 36 and the hydrocracking hydrogen stream in the second hydrogen split line 56 in upstream communication with the hydrocracking reactor 92. In an aspect, fresh hydrogen that is make-up hydrogen or has been purified of hydrogen sulfide and ammonia if recycled from a hydroprocessing reactor is fed in line 56 to the hydrotreating reactor 92.

It is preferred that the compressed make-up hydrogen stream in line 22 join the recycle gas stream in the first split line 24 downstream of the split 54, so the make-up hydrogen will be directed to supplying all of the hydrogen requirements to the hydrotreating reactor 36 or all of the hydrogen requirements to the hydrotreating reactor 36 not filled by the recycle hydrogen stream in line 52. It is also contemplated that the compressed make-up hydrogen stream in line 22 may join the recycle gas stream upstream of the split 54, but this would allow make-up gas to go to the hydrocracking unit 14 as well as to the hydrotreating unit 12. The hydrocarbon feed to the hydrotreating reactor 36 will have much higher coke precursors than the feed to the hydrocracking reactor 92. Hence, using the make-up hydrogen to increase the hydrogen partial pressure in the hydrotreating reactor 36 will enable the catalyst in the hydrotreating reactor to endure more heartily the more deleterious components in the feed. It is also contemplated, but not preferred, that at least a portion of the compressed make-up hydrogen stream in line 22 may feed the vaporous effluent stream in line 42 upstream of the recycle gas compressor 50. It is further contemplated that the make-up gas stream in line 22 may feed the second split line 56 downstream of the split 54.

Figure 2:
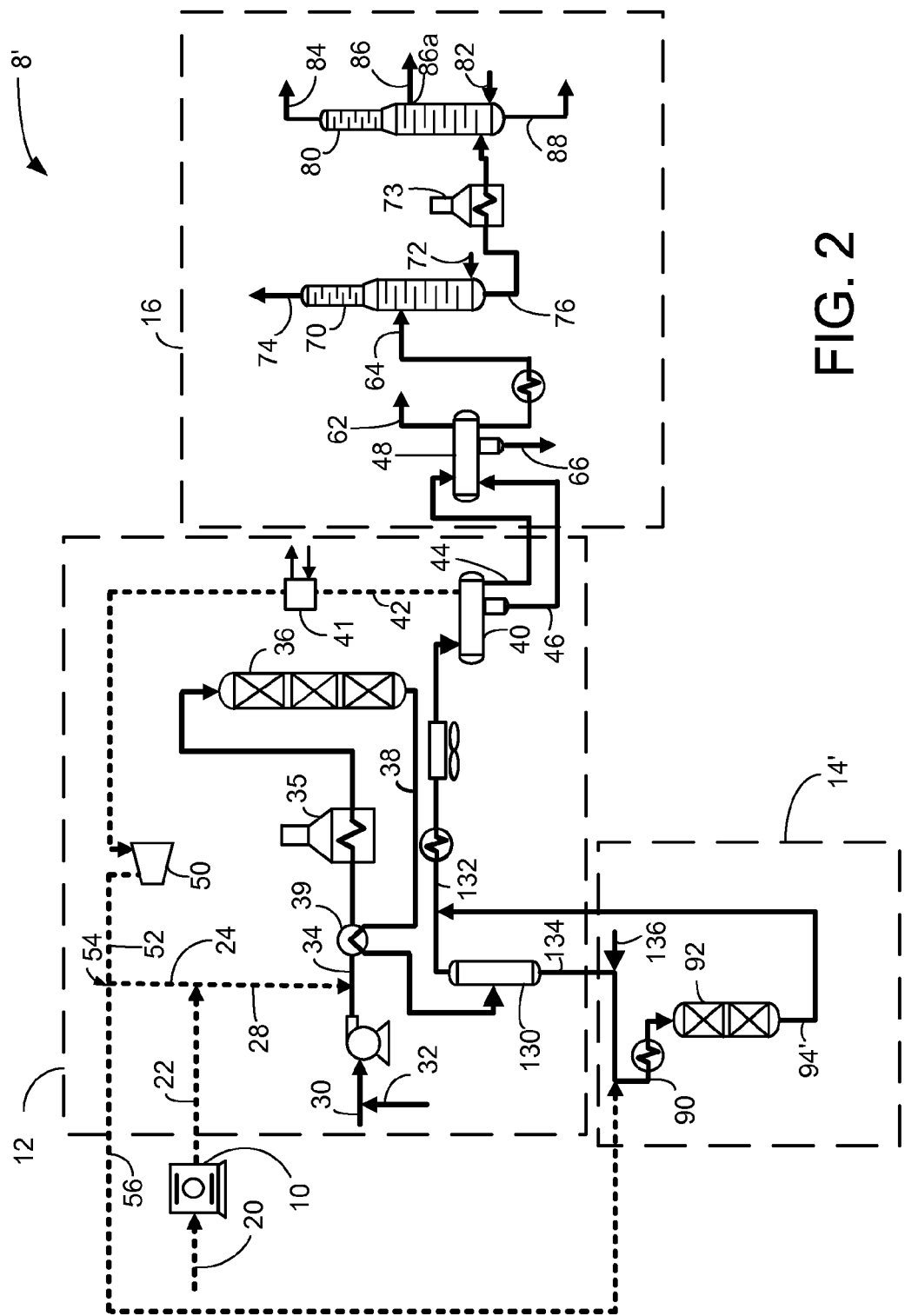
FIG. 2 is a simplified process flow diagram of an alternative embodiment of the present invention.

FIG. 2 illustrates an embodiment of a process and apparatus 8' that omits the hydrocracking separator 96 of FIG. 1 in the hydrocracking section 14'. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

In FIG. 2, the hydrocracking effluent in the hydrocracking effluent line 94' is fed to the hot separator overhead line 132 upstream of the cooling equipment to be processed with the vaporous hot hydrotreating effluent. The hydrocracking effluent line 94' is in downstream communication with the hydrocracking reactor 92. The cold separator 40 is in direct, downstream communication with the hydrocracking effluent line 94'. The hydrocracking effluent is separated with the vaporous hot hydrotreating effluent stream in the cold separator 40. The embodiment of FIG. 2 omits equipment in the hydrocracking section 14' that is provided in the hydrotreating section 12. The rest of the embodiment in FIG. 2 may be the same as described for FIG. 1 with the previous noted exceptions.

Figure 3:
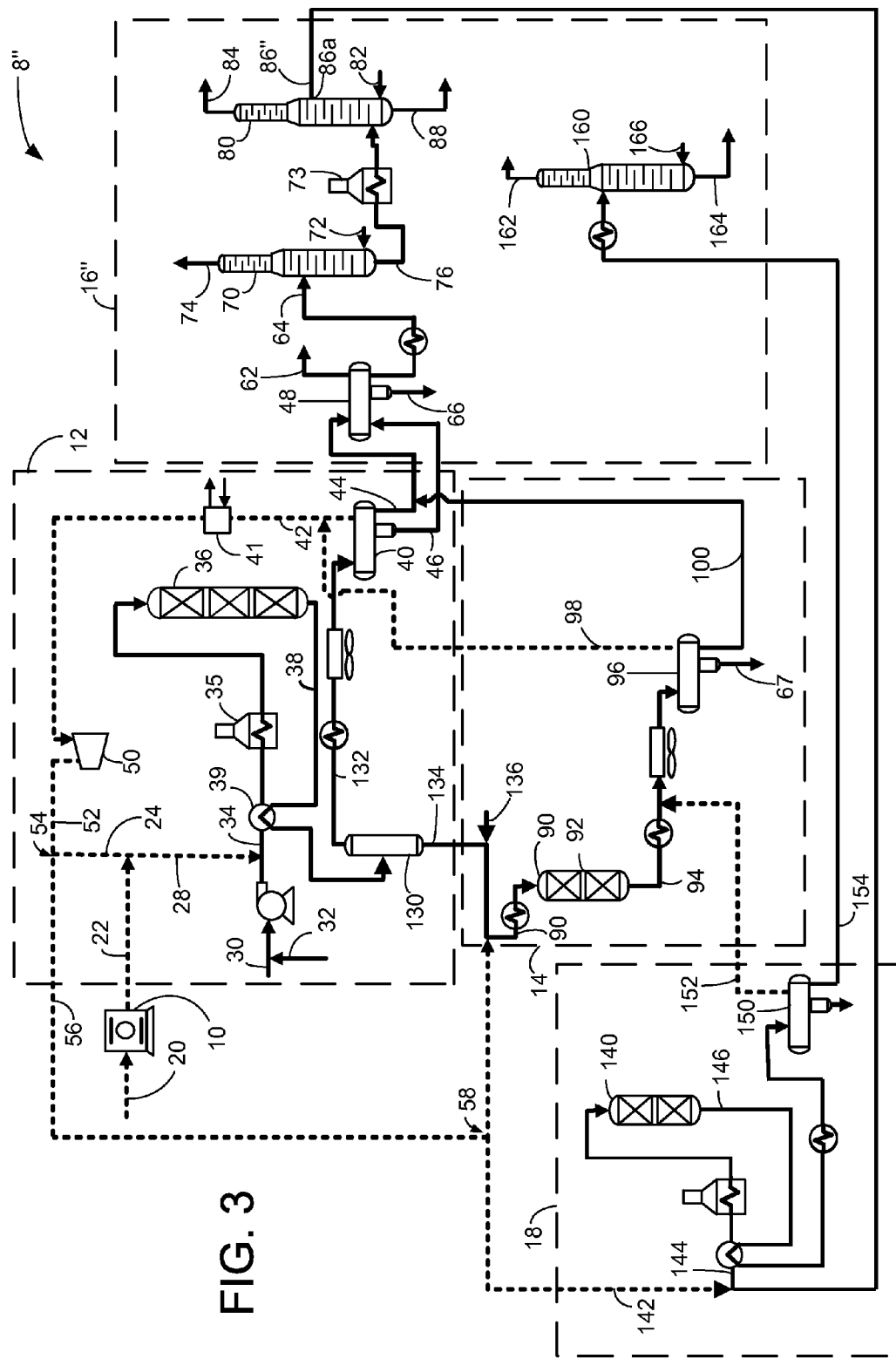
FIG. 3 is a simplified process flow diagram of a further embodiment of the present invention.

The diesel stream in diesel line 86 may be ULSD, but refiners may want greater a diesel product with higher cetane value. FIG. 3 illustrates an embodiment of a process and apparatus 8" that adds a saturation unit 18 to upgrade the cetane rating of the diesel stream. Many of the elements in FIG. 3 have the same configuration as in FIG. 1 and bear the same reference number. Elements in FIG. 3 that correspond to elements in FIG. 1 but have a different configuration bear the same reference numeral as in FIG. 1 but are marked with a double prime symbol (").

In FIG. 3, the apparatus and process 8" comprise a saturation reactor 140 in downstream communication with the diesel line 86" from the fractionation column 80. A third hydrogen split 58 provides a third hydrogen split line 142 that feeds a saturation hydrogen stream to the diesel line 86" to provide a saturation feed stream in saturation feed line 144. The saturation feed may be heat exchanged with saturated effluent in saturation effluent line 146 and heated in a furnace before entering the saturation reactor. In the saturation reactor, the aromatics in the saturation feed stream are saturated over a saturation catalyst at saturation conditions to produce cycloaliphatics to increase the cetane rating of the diesel.

Suitable saturation catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts. A preferred saturation catalyst is a noble metal catalyst for which the noble metal is selected from palladium and platinum. It is within the scope of the present invention that more than one type of saturation catalyst be used in the same saturation reactor 140. The noble metal is typically present in an amount ranging from 0.1 to 5 wt-%, preferably from 0.2 to 1.0 wt-% in the saturation catalyst.

Preferred saturation reaction conditions include a temperature from 149° C. (300° F.) to 455° C. (850° F.), suitably 222° C. (450° F.) to 427° C. (800° F.) and preferably 288° C. (550° F.) to 399° C. (750° F.), a pressure from 3.7 MPa (542 psig), preferably 5.8 MPa (842 psig) to 12.7 MPa (1842 psig), a liquid hourly space velocity of the fresh hydrocarbonaceous feedstock from 0.5 hr$^{-1}$ to 4 hr$^{-1}$, preferably from 1.5 to 3.5 hr$^{-1}$, and a hydrogen rate of 168 to 1,011 Nm$^3$/m$^3$ oil (1,000-6,000 scf/bbl), preferably 168 to 674 Nm$^3$/m$^3$ oil (1,000-4,000 scf/bbl) for diesel feed, with a saturation catalyst or a combination of saturation catalysts. The saturation unit 18 may be integrated with the hydrotreating unit 12 and with the hydrocracking unit 14, so they all operate at the same pressure accounting for normal pressure drop in the lines between units. In an aspect, the pressure in the saturation reactor 140 for saturating the diesel stream should be within about 200 kPa (29 psi) of the pressure in the hydrocracking reactor 92 for hydrocracking the liquid hot hydrotreating effluent stream and within 400 kPa (58 psi) of the pressure in the hydrotreating reactor 36 for hydrotreating the hydrocarbon feed stream. In a further aspect, the pressure in the saturation reactor 140 for saturating the diesel stream should be within about 400 kPa (58 psi) of the pressure in the hydrocracking reactor 92 for hydrocracking the liquid hot hydrotreating effluent stream and within 800 kPa (116 psi) of the pressure in the hydrotreating reactor 36 for hydrotreating the hydrocarbon feed stream. In an even further aspect, the pressure in the saturation reactor 140 for saturating the diesel stream should be within about 500 kPa (73 psi) of the pressure in the hydrocracking reactor 92 for hydrocracking the liquid hot hydrotreating effluent stream and within 1000 kPa (145 psi) of the pressure in the hydrotreating reactor 36 for hydrotreating the hydrocarbon feed stream.

The saturation effluent line 146 is in downstream communication with the saturation reactor 140 and carries a saturation effluent stream to a warm separator 150 in downstream communication with the saturation effluent line 146. The saturation effluent stream may be heat exchanged with the saturation feed stream and further cooled before entering the warm separator 150. The warm separator separates the saturation effluent stream into a vaporous saturation effluent stream in a warm separator overhead line 152 and a liquid saturation effluent stream in a warm separator bottoms line 154.

The warm separator 150 may be operated between about 149° C. (300° F.) and about 260° C. (500° F.). The pressure of the warm separator 150 is at about the pressure of the hydrotreating reactor 36 and the hydrocracking reactor 92 accounting for pressure drop in line 146. The warm separator may be operated to obtain at least 90 wt-% diesel and preferably at least 93 wt-% diesel in the liquid saturation effluent stream in the warm separator bottoms line 154. All of the other hydrocarbons and gases, naphtha and lighter, go up in the vaporous saturation effluent stream in line 152.

The hydrocracking separator 96 may be in downstream communication with the warm separator overhead line 152. The hydrocracking effluent line 94 may be in downstream communication with the warm separator overhead line 152 and mix with the vaporous saturation effluent stream between a cooler and a chiller at which the two mixing streams may be at compatible temperatures. The hydrocracking separator separates the vaporous saturation effluent stream along with the hydrocracking effluent stream into a vaporous hydrocracking effluent stream in the hydrocracking separator overhead line 98 which comprises hydrogen and light gases and the liquid hydrocracking effluent stream in the hydrocracking separator bottoms line 100 comprising naphtha and heavier hydrocarbons as explained with respect to FIG. 1.

A diesel stripper column 160 may be in downstream communication with the warm separator bottoms line 154 in the fractionation section 16". The diesel stripper column 160 may separate the liquid saturation effluent stream by stripping from steam or another inert gas in line 166 to provide a light ends stream comprising residual naphtha in overhead line 162 and a high cetane, low sulfur diesel stream, perhaps an ultra-low sulfur diesel stream, in bottoms line 164. The diesel stripper column 160 may be operated with a bottoms temperature between about 150° C. (302° F.) and about 385° C. (725° F.), preferably between about 315° C. (600° F.) and about 357° C. (675° F.) and at or near atmospheric pressure. The bottoms temperature may even be lower than 150° C. A portion of the bottoms stream may be reboiled and returned to the diesel stripper column 160 instead of providing heat to the column with inert gas stripping.

It is contemplated that if the warm separator 150 were operated as a cold separator, the vaporous saturation effluent in overhead line 152 could be joined with hydrocracking separator overhead line 98 or cold separator overhead line 42.

The rest of the embodiment in FIG. 3 may be the same as described for FIG. 1 with the previously noted exceptions.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for producing diesel from a hydrocarbon stream comprising:
   hydrotreating reactor;
   a hot separator for separating a hydrotreating effluent stream into a vaporous hot hydrotreating effluent stream in a hot separator overhead line and a liquid hot hydrotreating effluent stream in a hot separator bottoms line;
   a cold separator in direct communication with the hot separator overhead line for separating said vaporous hot hydrotreating effluent stream into a vaporous cold hydrotreating effluent stream and a liquid cold hydrotreating effluent stream in a cold separator bottoms line;

a fractionation column in communication with said cold separator bottoms line; and a hydrocracking reactor in communication with said hot separator bottoms line for hydrocracking said liquid hot hydrotreating effluent stream.

2. The apparatus of claim 1 further comprising a hydrocarbon feed line and a hydrocarbon co-feed line and said hydrotreating reactor in communication with said hydrocarbon feed line and said hydrotreating co-feed line.

3. The apparatus of claim 1 further comprising a hydrotreating effluent line in communication with the hydrotreating reactor, the hot separator in communication with the hydrotreating effluent line and a cooler on the hydrotreating effluent line.

4. The apparatus of claim 1 further comprising a hydrocracking effluent line in communication with the hydrocracking reactor and said cold separator in communication with said hydrocracking effluent line.

5. The apparatus of claim 1 further comprising a hydrocracking effluent line in communication with the hydrocracking reactor and a hydrocracking separator in communication with said hydrocracking effluent line; said hydrocracking separator for separating said hydrocracking effluent stream into a vaporous hydrocracking effluent stream in a hydrocracking separator overhead line and a liquid hydrocracking separator effluent stream in a hydrocracking separator bottoms line.

6. The apparatus of claim 5 further comprising a hydrocracking separator bottoms line and said fractionation column in communication with said hydrocracking separator bottoms line.

7. The apparatus of claim 5 further comprising a hydrocracking separator overhead line and a cold separator overhead line is in communication with said hydrocracking separator overhead line.

8. The apparatus of claim 1 further comprising a diesel line in communication with a side outlet of said fractionation column.

9. The apparatus of claim 8 further comprising a saturation reactor in communication with said diesel line.

10. The apparatus of claim 9 further comprising a saturation effluent line in communication with the saturation reactor and a warm separator in communication with said saturation effluent line; said warm separator for separating said saturation effluent stream into a vaporous saturation effluent stream in a warm separator overhead line and a liquid saturation effluent stream in a warm separator bottoms line.

11. The apparatus of claim 10 wherein said hydrocracking separator is in downstream communication with said warm separator overhead line.

12. The apparatus of claim 11 wherein said hydrocracking effluent line is in downstream communication with said warm separator overhead line.

13. The apparatus of claim 10 further comprising a diesel stripper column in communication said warm separator bottoms line.

14. An apparatus for producing diesel from a hydrocarbon stream comprising:

hydrotreating reactor;

a hot separator for separating a hydrotreating effluent stream into a vaporous hot hydrotreating effluent stream in a hot separator overhead line and a liquid hot hydrotreating effluent stream in a hot separator bottoms line;

a cold separator in direct communication with the hot separator overhead line for separating said vaporous hot hydrotreating effluent stream into a vaporous cold hydrotreating effluent stream and a liquid cold hydrotreating effluent stream in a cold separator bottoms line;

a fractionation column in communication with said cold separator bottoms line;

a hydrocracking reactor in communication with said hot separator bottoms line for hydrocracking said liquid hot hydrotreating effluent stream; and a saturation reactor in communication with said fractionation column.

15. The apparatus of claim 14 further comprising a hydrocarbon feed line and a hydrocarbon co-feed line and said hydrotreating reactor in communication with said hydrocarbon feed line and said hydrotreating co-feed line.

16. The apparatus of claim 14 further comprising a hydrocracking effluent line in communication with the hydrocracking reactor and said cold separator in communication with said hydrocracking effluent line.

17. The apparatus of claim 14 further comprising a hydrocracking effluent line in communication with the hydrocracking reactor and a hydrocracking separator in communication with said hydrocracking effluent line; said hydrocracking separator for separating said hydrocracking effluent stream into a vaporous hydrocracking effluent stream in a hydrocracking separator overhead line and a liquid hydrocracking separator effluent stream in a hydrocracking separator bottoms line; said hydrocracking separator bottoms line in communication with said fractionation column.

18. The apparatus of claim 14 further comprising a diesel line in communication with a side outlet of said fractionation column and said saturation reactor in communication with said diesel line.

19. An apparatus for producing diesel from a hydrocarbon stream comprising:

hydrotreating reactor;

a hot separator for separating a hydrotreating effluent stream into a vaporous hot hydrotreating effluent stream in a hot separator overhead line and a liquid hot hydrotreating effluent stream in a hot separator bottoms line;

a cold separator in direct communication with the hot separator overhead line for separating said vaporous hot hydrotreating effluent stream into a vaporous cold hydrotreating effluent stream and a liquid cold hydrotreating effluent stream in a cold separator bottoms line;

a fractionation column in communication with said cold separator bottoms line and a diesel line in communication with a side outlet of said fractionation column; and a hydrocracking reactor in communication with said hot separator bottoms line for hydrocracking said liquid hot hydrotreating effluent stream.

20. The apparatus of claim 19 further comprising a saturation reactor in communication with said diesel line.

* * * * *